(12) United States Patent
Nohmi

(10) Patent No.: US 9,127,926 B2
(45) Date of Patent: Sep. 8, 2015

(54) REPAIR-PIPE/DESIGNED-PIPE MEASURING SYSTEM

(75) Inventor: Kenji Nohmi, Kitakyushu (JP)

(73) Assignee: PLUS ONE TECHNO CO., LTD., Kitakyushu-Shi, Fukuoka (JP)

( * ) Notice: Subject to any disclaimer, the term of this patent is extended or adjusted under 35 U.S.C. 154(b) by 432 days.

(21) Appl. No.: 13/811,360

(22) PCT Filed: Jul. 21, 2011

(86) PCT No.: PCT/JP2011/004111
§ 371 (c)(1),
(2), (4) Date: Aug. 6, 2013

(87) PCT Pub. No.: WO2012/011283
PCT Pub. Date: Jan. 26, 2012

(65) Prior Publication Data
US 2013/0305550 A1   Nov. 21, 2013

(30) Foreign Application Priority Data

Jul. 22, 2010   (JP) .................................. 2010-164637

(51) Int. Cl.
*G01B 5/00* (2006.01)
*G01B 5/24* (2006.01)
(Continued)

(52) U.S. Cl.
CPC .............. *G01B 5/24* (2013.01); *F16L 55/1608* (2013.01); *F16L 55/18* (2013.01); *G01B 5/00* (2013.01); *G01B 5/02* (2013.01); *G01B 21/00* (2013.01)

(58) Field of Classification Search
CPC .................................... G01B 5/02; G01B 5/24
USPC .................................................. 33/529, 534
See application file for complete search history.

(56) References Cited

U.S. PATENT DOCUMENTS 6,301,954 B1 * 10/2001 Schuberth et al. ................. 73/40
7,015,419 B2 * 3/2006 Hackl et al. .............. 219/130.21
(Continued)

FOREIGN PATENT DOCUMENTS

JP   49-46960 A   5/1974
JP   56-51602 A   5/1981
(Continued)

*Primary Examiner* — Yaritza Guadalupe-McCall
(74) *Attorney, Agent, or Firm* — patenttm.us

(57) ABSTRACT

Provided is a repair-pipeldesig led-pipe measuring system for measuring the flange faces of a pair of flanges at both ends of a repair pipe or a designed pipe and obtaining spatial position data of the flange faces, the repair pipe being brought in a factory and repaired when a defect such as leakage occurs in a pipe used for carrying a liquid or a gas in ships, plants, and other places in order that the defective portion is reworked, and the designed pipe being made on the basis of a design in order that the error between the design and itself is checked. An object (2) to be measured such as a pipe or the like is set between a reference stage to which a position measuring device (3) previously invented by the present inventor for the purpose of another use is attached and a related stage which is processed to have an accurate positional relationship with respect to the reference stage and to which the position measuring device is attachable. The object to be measured is measured from both the reference stage side and the related stage side by using the position measuring devices, which the position measuring devices may be moved by connecting the reference stage with the related stage by a sliding mechanism. This accurately checks the positional relationship of the flanges at both ends of a pipe or the like.

2 Claims, 7 Drawing Sheets

(51) Int. Cl.
*F16L 55/16* (2006.01)
*F16L 55/18* (2006.01)
*G01B 21/00* (2006.01)
*G01B 5/02* (2006.01)

(56) References Cited

U.S. PATENT DOCUMENTS 7,042,555 B1 * 5/2006 Lawson .............................. 356/3
7,370,431 B2 * 5/2008 Sowder ............................ 33/529
2013/0305550 A1 * 11/2013 Nohmi ............................ 33/534

FOREIGN PATENT DOCUMENTS

| JP | 9-5006 A | 1/1997 |
| JP | 11-281303 A | 10/1999 |
| JP | 2000-329502 A | 11/2000 |

* cited by examiner (a)

plane view (b)

plane view (c)

plane view (d)

plane view (a)

(b)

(a)

(b)

(a)

(b)

enlarged section view of AF erea shown in (a) of FIG.6

US 9,127,926 B2

REPAIR-PIPE/DESIGNED-PIPE MEASURING SYSTEM

FIELD OF THE INVENTION

The present invention relates to a repair pipe/designed pipe measuring system for measuring the flange faces of a pair of flanges at both ends of a repair pipe or a designed pipe and obtaining spatial position data of the flange faces, and more particularly, to the repair pipe being brought in a factory and repaired in order that the defective portion is reworked when a defect such as leakage occurs in a pipe used for carrying a liquid or a gas in ships, plants, and other places, and to the designed pipe being made on the basis of a design in order that the error between the design and itself is checked.

BACKGROUND OF THE INVENTION

FIG. 6 and FIG. 7 are schematic views of the repair pipe measuring system in a conventional art. And (a) of FIG. 6 is a perspective view indicating the aspect measuring the position of the first flange, (b) of FIG. 6 is a perspective view indicating the aspect measuring the position of the second flange, (a) of FIG. 7 is a perspective view indicating the measurement device, and (b) of FIG. 7 is an enlarged sectional view indicating the details of the wire mount.

As shown in (a) (b) of FIG. 6, the repair pipe measuring system 101 shows a system and a method to measure the spatial position of the flange faces in a pair of flanges for obtaining the external form dimensions of a repair object pipe repairing this malfunction when a defect such as leakage occurs in a pipe used for carrying a liquid or a gas in ships, plants, and other places. The repair pipe measuring system 101 comprises the pipes 102a, the repair object pipe 102 having the first flange 104 and the second flange 105 at both ends of this pipe 102a, the measuring device 106 for measuring the positions of the first flange face 104a and the second flange face 105a of at least one pipe 102a side in the first flange 104 and the second flange 105. The attachment 108 equipped with this measuring device 106 on the measuring device plate 108d is fixed to the pipe 102a. It's prepared Several kinds of attachments for the bore diameters of φ10 cm -φ30 cm, φ10 cm-φ60 cm, and φ10 cm-φ100 cm according to the diameter of the pipe with these flanges.

As shown in FIG. 6 and (a) of FIG. 7, the measuring device 106 measures the spatial position of the wire installation jig 119 which is attached to the flange face 104a of the first flange 104. In addition, it is not shown in the figure, it's attaching the wire installation jig 119 to the second flange face 105a, and it's measuring the position of the second flange face 105a. As seen above, without being as the measurement reference the position of the second flange face 105a, by measuring both positions of the first flange face 104a and the second flange face 105a, it can measure the external form dimensions of the repair object pipe 102 with a high degree of accuracy without being influenced by the external form precision of the flange side.

In addition, as shown in (b) of FIG. 7, the wire installation jig 119 comprises the ring-shaped wire attaching portion 119a, the base 119b supported and positioned on the periphery of the bolt hole 104b of the first flange 104, the fit portion 119c being inserted and fitted in the bolt hole 104b, the screw region 119d, and the taper nut 119e.

Hereby, by centering the wire installation jig 119 using the taper nut 119e from the back side of the first flange 104 so that the center of the wire installation jig 119 makes a center of the bolt hole 104b, making the center of the wire installation jig 119 is easy, and the measurement reference can be set quickly.

In addition, the measuring device 106 reels out the wire 114 and reels off it, and comprises the wire rewind portion 116 with the derived-wire-length measuring means 116a that is measurable the length of the derived-wire 114, the arm 117 which turns to the direction to derive the wire 114, is possible to measure the arm angle θ1 which the arm turns, reals out/realsoff the wire 114 at between the wire rewind portion 116 and the arm, and supports the wire 114, and the swivel 118 which makes the wire-rewind portion 116 to turn to the wire derived-direction and is possible to measure the the turning angle θ2.

Hereby, in straight pipes and bent pipes using for carrying a liquid or a gas in ships, plants, and other places, the attachment with the measuring device is possible to easily equip near at the repair object pipes which the defective portions such as leakage are repaired, and the measuring device is possible to measure the external form dimensions quickly and precisely.

Furthermore, the repair-pipe measuring system 101 can decide the posture of the flange faces. namely, the spatial position, and the angle, and easily make the working drawing of the pipe. In addition, the repair-pipe measuring system 101 can easily produce straight pipes and bent pipes with flanges in the factory, and makes to be possible to deliver them to the next port of the ship(see Patent Document 1)

[Patent Document 1] Japanese Patent Laid-Open Publication No. 2010-009495

However, it was necessary to bring the repair pipe in a factory and repair in order that the defective portion is reworked when a defect such as leakage occurs in a pipe used for carrying a liquid or a gas in ships, plants, and other places.

And by measuring the external form dimensions of the designed pipe being made on the basis of a design in order that the error between the design and itself is checked, it was necessary to acquire the electronic data, and generate the working drawing of the repair-pipe design pipe in high reproducible accuracy on basis of the electronic data.

In view of the above problems, it is an object of the present invention to provide a repair pipe/designed pipe measuring system for measuring the flange faces of a pair of flanges at both ends of the repair pipe being brought in a factory and being repaired in order that the defective portion is reworked when a defect such as leakage occurs in a pipe used for carrying a liquid or a gas in ships, plants, and other places, or of the designed pipe being made on the basis of a design drawing in order that the error between the design and itself is checked, and for obtaining spatial position data of the flange faces.

SUMMARY OF THE INVENTION

A repair pipe/designed pipe measuring system 1 according to a first aspect of the present invention is what is measuring the flange faces of a pair of flanges at both ends of a repair pipe or a designed pipe and obtaining spatial position data AL of the flange faces in order that the defective portion is reworked when a defect such as leakage occurs in a pipe used for carrying a liquid or a gas in ships, plants, and other places. The said repair pipe/designed pipe measuring system 1 comprises;

the repair pipe 2 having the left flange 2a and the right flange 2b at both ends of the pipe as a measuring object, the position measuring device 3 having the wire centering mechanism 3b and the swivel 3c which is possible to measure the length and the angle in the plural positions on the flange face 2aa of the left flange 2a and on the flange face 2ba of the right flange 2b by using the take-up wire 3a, the mobile stage 4 having fixedly the said positioning measuring device 3 on the mobile stage 4, and moving parallel for the said repair pipe 2, the mobile stage sliding mechanism 5 which holds this mobile stage 4, and easily slides this mobile stage 4, the table board 6 which fixs the said mobile stage sliding mechanism 5, the pipe supporting stage 7 which positions the said repair pipe 2 on the said table board 6.

Furthermore, the said mobile stage sliding mechanism 5 comprises;

the left side plate 5a and the right side plate 5b which is fixed at both the right and left ends of the said table board 6, the sliding portion 5c which is set up between the said right side plates 5a and the said left side plate 5b, and makes the said mobile stage 4 to move on the said sliding portion 5c.

In addition, the said sliding portion 5c makes the said mobile stage 4 to move at least one area between the said right side plates 5a and the said left side plate 5b on the table board 6. And the position measuring device 3 measures the position of the flange face in the said repair pipe 2 at the position that makes the mobile stage 4 to stop. And the position measuring device 3 makes the wire 3a to strain which is equipped in the said positioning measuring device 3, and lets contact with the said flange face.

A repair pipe/designed pipe measuring system 1' according to a second aspect of the present invention comprises;

the vertical plate 8 which can attach the back side to the reference stage 16 or the related stage 17, the swivel plate 9 which can attach orthogonally on the surface of the said vertical plate 8, the swivel 3c having the axis 10 which is parallel to the reference stage 16 or the related stage 17, and which is rotatably attached for the said vertical plate 8, the measuring axle 12 which is rotatably attached at right angle to the axis 10, the wire guiding arm 3d that is made of conductor attached to be tilting possibility around the axis at right angle to the said measuring axis, the first angle detection sensor 14, and the second angle detection sensor 15 which each measures the swivel angle of the swivel and the rotating angle of the said measuring axle 12, the wire length sensor 11 which measure the length of the wire 3a at the measuring point of the wire which is derived from the said wire guiding arm in strain state, the arm perception portion 18, 19 consisting of a pair of the discotic boards attached in the said swivel in a state to catch both sides of the said wire guiding arm, the said position measuring device 3 having the ditch-model-contact sensor 20 which makes slightly more the clearance of the said arm perception portions than the width of the said wire guiding arm, and turns on at contact with the said arm perception portion of the said arm in an arbitrary tilting position, and turns off at non-contact, the said reference stage 16 which can attach the said position measuring device, the said related stage 17 which can attach the said position measuring device, which is face-to-face for the said reference stage, and which has a high accuracy positional relationship with the said reference stage, the common table board 24 which the said reference stage, the said related stage, and the at least two pipe supporting stages 23, 23 for fixing the object 22 to be measured such as the repair pipe or the design pipe produced by the design drawing, the control unit 25 which operates the position of the measuring point by inputting the output signals of the said first angle detection sensor, the said second angle detection sensor, and the wire length sensor which can be got by using the said position measuring device.

According to a first aspect and a second aspect of the present invention, the repair-pipe/designed-pipe measuring system can measure easily at high precision the position of the flange faces of the repair pipe or the duct, and the position of the bolt holes.

In addition, since the said measuring system is cheep, and easy in structure and operation, we can progress greatly to the direction carrying out the inspection of the design pipe before shipment.

In addition, in the case of using the conventional technique, the price is very high, and is 50~60 million yen. The skilled operators were needed as the operation was very complicated. Therefore, in case of the present conditions, the inspection of the finished pipe was not performed in almost case. However, when there was any mistake in the production of a big pipe, it is a serious loss in the trouble of the round trip man-hour and the late of delivery.

As above, since the mistake in the production of the pipe can check beforehand, there are great effects to be able to omit the a lot of waste that the pipe is brought to the factory again and is produced again.

Figure 6:
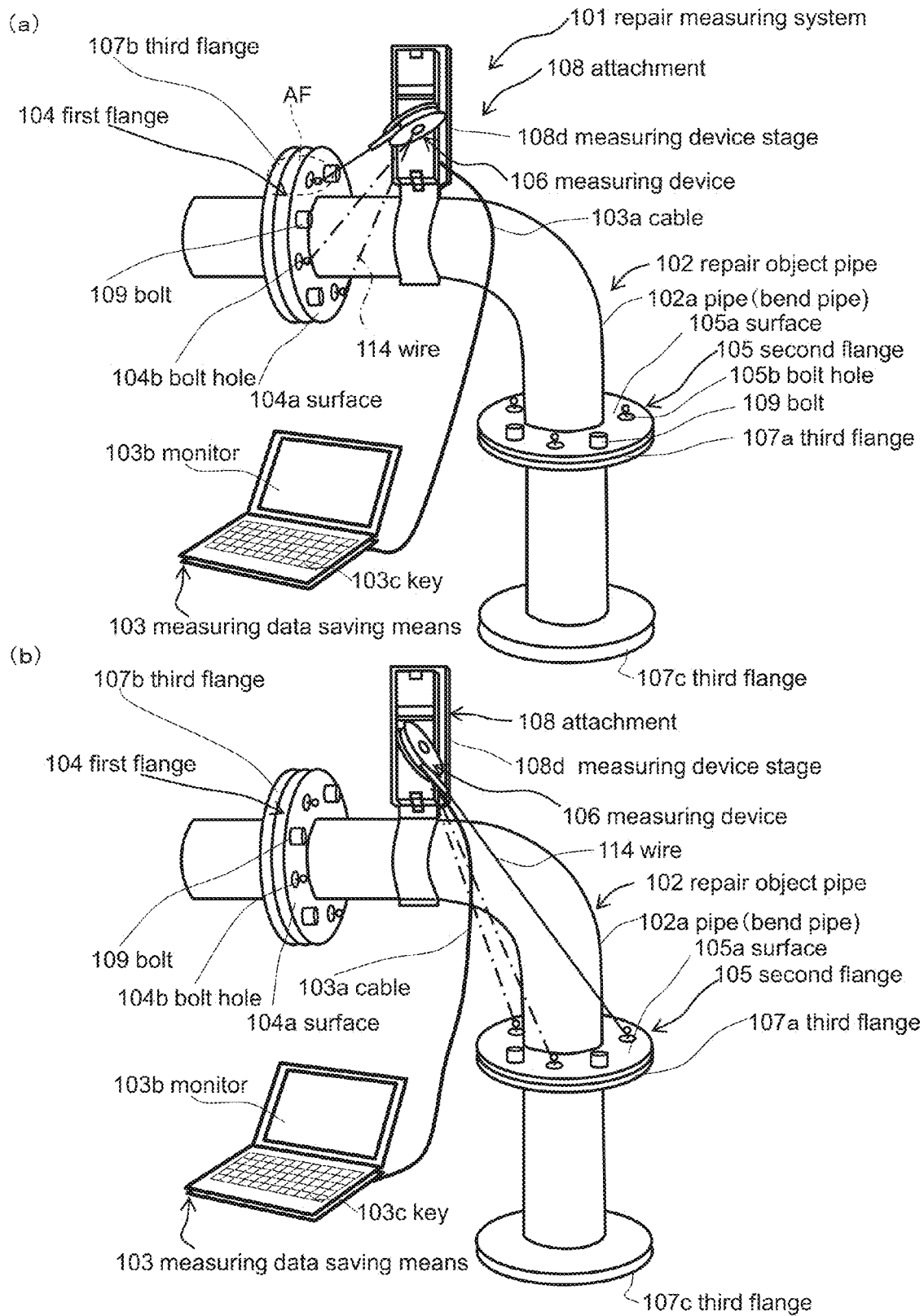
FIG. 6 is a measuring method of a repair pipe measuring system to explain a conventional embodiment, and includes (a) (b), in which (a) is a perspective view showing a state measuring a position of a first flange, (b) is a perspective view showing a state measuring a position of a second flange.
Figure 7:
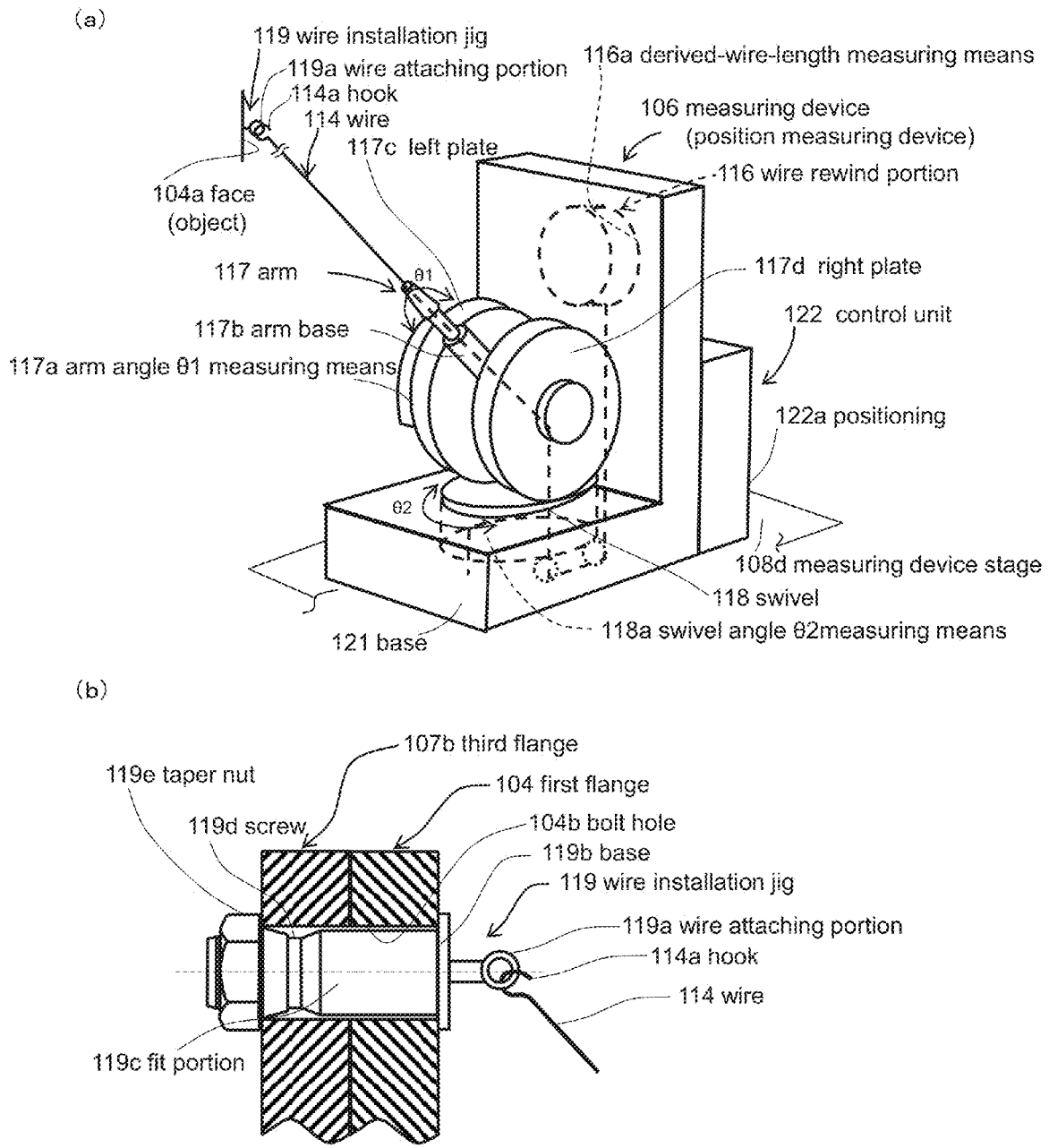
FIG. 7 is a schematic view of a measuring device to explain a conventional embodiment, and includes (a) (b), in which (a)

is a perspective view, (b) is a enlarged section view of AF area shown in (a) of FIG. 6 showing a structure of near a wire installation jig.

DETAILED DESCRIPTION OF EMBODIMENT

A repair-pipe/designed-pipe measuring system according to a first embodiment of the present invention will be described below reference to the attached drawings.

Figure 1:
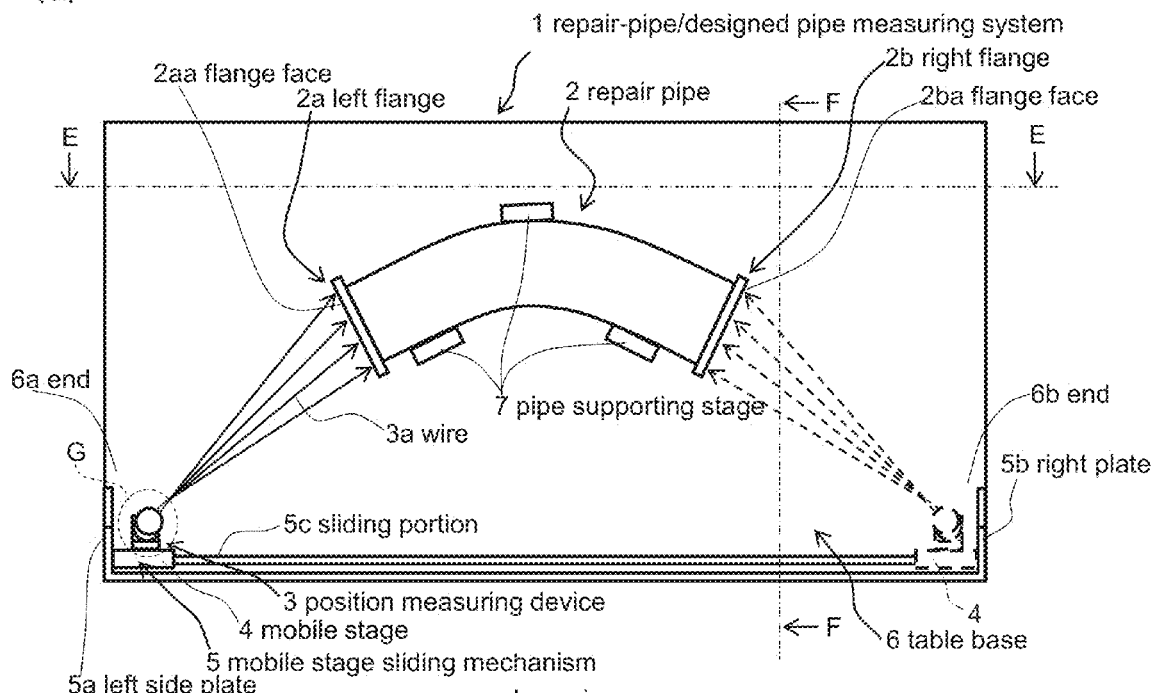
FIG. 1 is a schematic view of a repair-pipe/designed-pipe measuring system to explain a first embodiment of the present invention, and includes (a) (b) (c) and (d), in which (a) is a plane view, (b) is a end view of E-E line shown in (a), (c) is a end view of F-F line shown in (a), and (d) is a enlarged perspective view of G area shown in (a)
Figure 1:
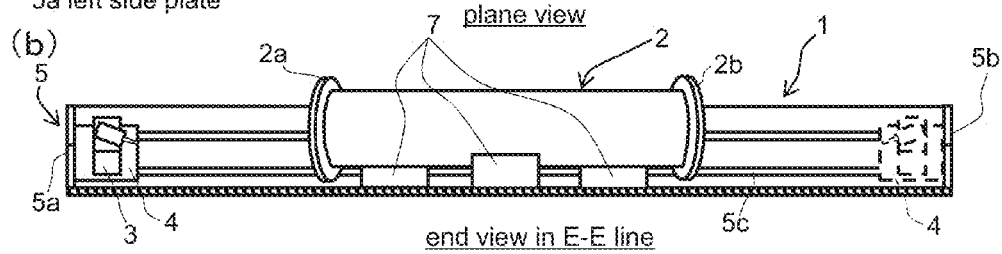
Figure 1:
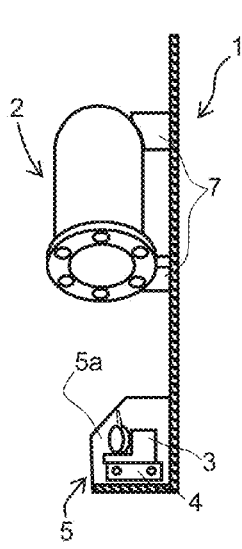
Figure 1:
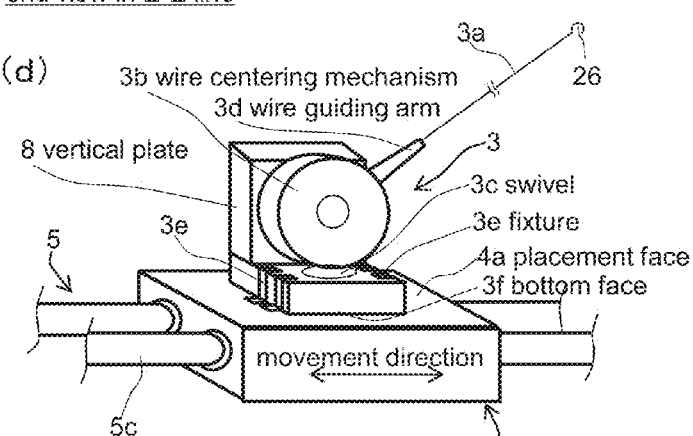

FIG. 1 is a schematic view of a repair-pipe/designed-pipe measuring system to explain a first embodiment of the present invention, and includes (a) (b) (c) and (d), in which (a) is a plane view, (b) is a end view of E-E line shown in (a), (c) is a end view of F-F line shown in (a), and (d) is a enlarged perspective view of G area shown in (a).

As shown in (a) (b) (c) of FIG. 1, a repair-pipe/designed-pipe measuring system 1 is what is measuring the flange faces of a pair of flanges at both ends of a repair pipe or a designed pipe and obtaining the spatial position data of the flange faces in order that the defective portion is reworked when a defect such as leakage occurs in a pipe used for carrying a liquid or a gas in ships, plants, and other places.

And this repair pipe/designed pipe measuring system 1 comprises the repair pipe 2 (or the designed pipe) having the left flange 2a and the right flange 2b at both ends of the pipe as a measuring object, the position measuring device 3 having the wire centering mechanism 3b and the swivel 3c which is possible to measure the lengths and the angles in the plural positions on the flange face 2aa of the left flange 2a and on the flange face 2ba of the right flange 2b by using the take-up wire 3a, the mobile stage 4 having fixedly this position measuring device 3 on the mobile stage 4, and moving parallel for the repair pipe 2, the mobile stage sliding mechanism 5 which holds the mobile stage 4, and easily slides this mobile stage 4, the table board 6 which fixs the mobile stage sliding mechanism 5, and the pipe supporting stage 7 which positions the repair pipe 2 on the table board 6.

And the mobile stage sliding mechanism 5 comprises the left side plate 5a and the right side plate 5b which is fixed at both the right end 6a and the left end 6b of the table board 6, the sliding portion 5c which is set up between the right side plates 5a and the left side plate 5b, and makes the mobile stage 4 to move on the sliding portion 5c.

In addition, the sliding portion 5c makes the mobile stage 4 to move at least one area between the right side plate 5a and the left side plate 5b at both ends 6a, 6b of the table board 6.

And the position measuring device 3 makes the wire 3a to strain which is equipped in the positioning measuring device 3, and lets contact with the flange face 2aa, 2ba. And the position measuring device 3 measures the spatial position of the flange face 2aa, 2ba in the repair pipe 2 at the position that makes the mobile stage 4 to stop.

Figure 3:
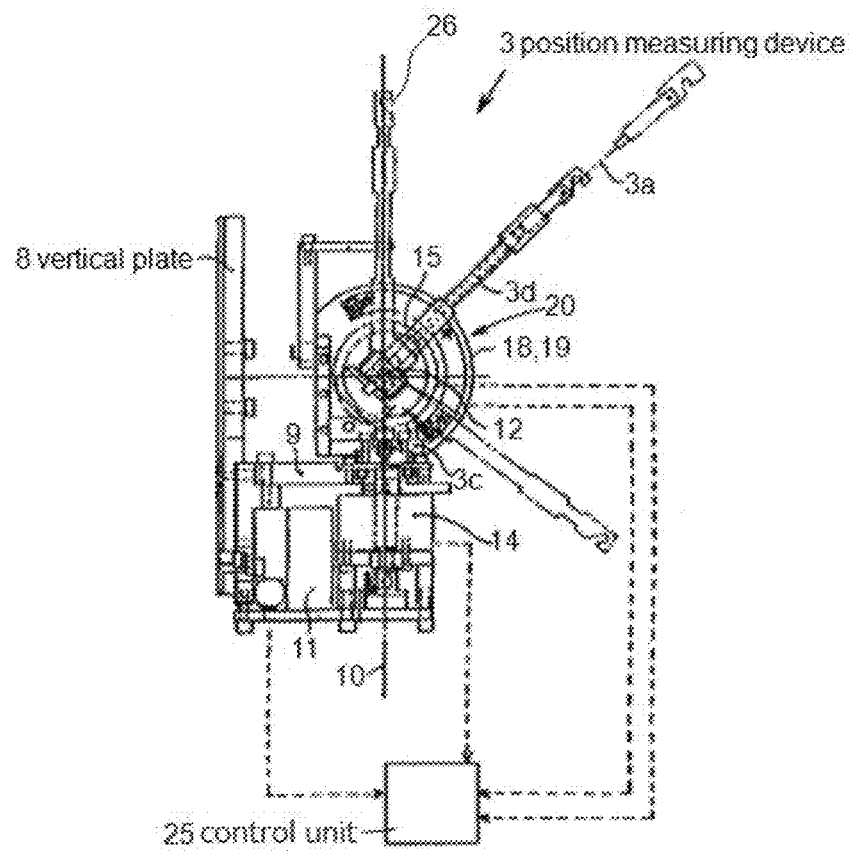
FIG. 3 is a schematic view showing a position measuring device to explain a embodiment of the present invention, and includes (a) (b), in which (a) is a elevation view, and (b) is a elevation view showing a measuring method of a reference flange, or a left flange.
Figure 3:
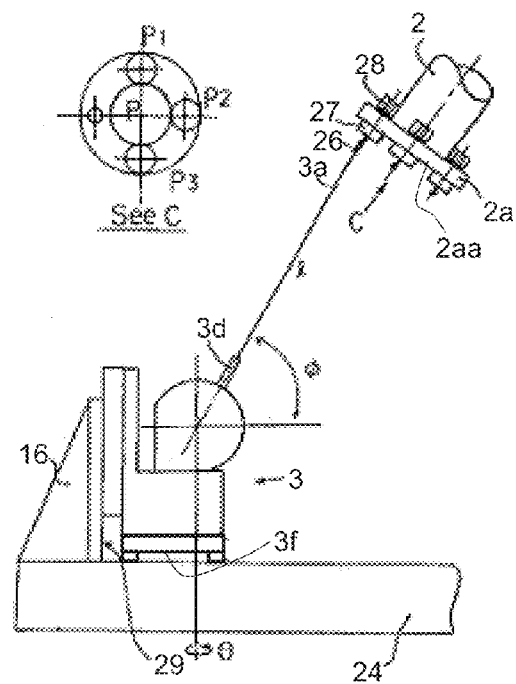

FIG. 3 is a schematic view showing a position measuring device to explain a embodiment of the present invention, and includes (a) (b), in which (a) is a elevation view, (b) is a elevation view showing a measuring method of a reference flange or a left flange;

As shown in (d) of FIG. 1 and (a) of FIG. 3, the position measuring device 3 that was put on the mobile stage 4 by contacting with the bottom surface 3f is attached at right angle to the vertical plate 8 of the position measuring device 3. And the position measuring device 3 compresses the the swivel plate 9 which can attach orthogonally on the surface of the vertical plate 8, the swivel 3c having the axis 10 which is rotatably attached for the vertical plate 8, the measuring axle 12 which is rotatably attached at right angle to the axis 10 of the swivel 3c, the first angle detection sensor 14, and the second angle detection sensor 15 which each measures the swivel angle A of the swivel 3c and the rotating angle p of the measuring axle 12 in the wire guiding arm 3d that makes of a conductor attached to be tilting possibility around the axis at right angle to the axis of the measuring axis 12, the wire length sensor 11 which measures the length of the wire 3a at the point of the wire 3a which is derived from the wire guiding arm 3d in a strain state, the arm perception portion 18, 19 consisting of a pair of the discotic boards attached in the swivel 3c in a state to catch both sides of the wire guiding arm 3d, the ditch model contact sensor 20 which turns on at contact with between the arm perception portions 18, 19 and the wire guiding arm 3d, and turns off at non-contact, the control unit 25 which calculates the positional relationship by inputting the data obtained by using the first angle detection sensor 14, the second angle detection sensor 15, and the position measuring device 3.

Next, the detail of a repair-pipe/designed-pipe measuring system according to a first embodiment of the present invention will be described below with reference to from FIG. 1 to FIG. 4.

Figure 4:
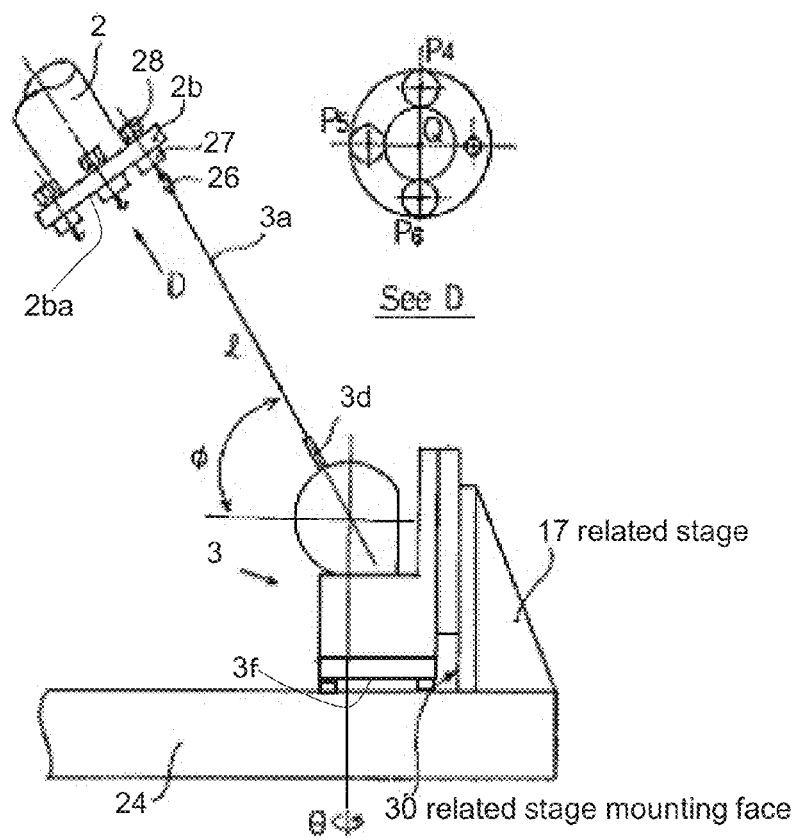
FIG. 4 is a schematic view showing a reference stage or a related stage to explain a embodiment of the present invention, and includes (a) (b), in which (a) is a elevation view showing a measuring method of a related flange or a right flange, (b) is a three dimension view showing a position relations a left flange (a reference flange) and a right flange (a related flange)
Figure 4:
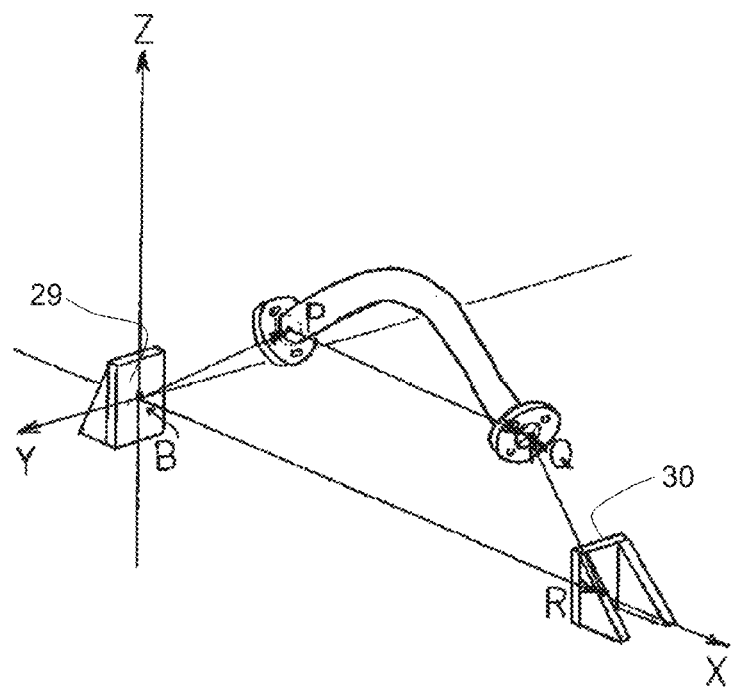

(b) of FIG. 3 is a elevation view showing a measuring method of a left flange according to the present invention, (a) of FIG. 4 is a elevation view showing a measuring method of a right flange according to the present invention.

First, as shown in (a) (b) (c) of FIG. 1, at least two pipe-supporting stages 7, three pipe-supporting stages in the embodiment that can freely move is put in the central of the table board 6. On the pipe-supporting stages the pipe 2 as the object being measured is put as shown in (a) of FIG. 1.

Next, the wire 3a which is drawn in a strain state from the position measuring device 3 put on the mobile stage 4 in the left end 6a is latched together in the flange face 2aa of the left flange 2a.

As shown in (b) of FIG. 3, the hook-latching jig 27 is screwed into any three bolt-holes of the left flange 2a in the pipe 2.

At this time, the hook-latching jig 27 is screwed into the taper nut 28 from the back side of the flange so that the center of the hook-latching jig 27 is positioning a center of the bolt hole.

And the wire 3a is drawn from the tip of the wire guiding arm 3d of the position measuring device 3, and the wire-tip hook 26 is latched by the hook-latching jig 27.

The wire guiding arm 3d tilts to the direction of the left flange 2a because the wire 3a has the tension as the wire encoder.

The output signal of the wire-length I (L) of one measuring point P1, the swivel angle θ between the wire guiding arm 3d and the swivel 3c, and the rotating angle φ of the measuring axis 12 is input into the control unit 25.

By the similar method, the other two measuring points P2, P3 are measured.

Based on the distance data and the angle data of the plural measuring points P1 P2 and P3 got by this method, the plane surface including the measuring point P1 P2 and P3 is operated, and the center point P of the surface and the position of the bolt holes are operated. Hereby, the positional relationship between the position measuring device 3 and the left flange 2a is provided precisely.

Next, as shown in (a) of FIG. 1, the position measuring device 3 is moved by the end 6b on the right side in a figure. In addition, as shown in (a) of FIG. 4, the hook-latching jig 27 is fixed to any three places of the bolt holes of the right flange 2b of the pipe 2.

At this time, the hook latching jig 27 is fixed by the nuts 28 with the taper from the back side of the flange so that the center of the hook latching jig 27 become the center of the bolt hole. And the wire 3a is drawn from the tip of the wire guiding arm 3d of the position measuring device 3, and the wire tip hook 26 is fixed by the hook latching jig 27. The wire guiding arm 3d tilts to the direction of the right flange 2b because the wire 3a has the tension as the wire encoder.

The output signal of the wire-length I (L) of one measuring point P4, the swivel angle θ between the wire guiding arm 3d and the swivel 3c, and the rotating angle φ of the measuring axis 12 is input into the control unit 25.

By the similar method, the other two measuring points P5, P6 are measured.

Based on the distance data and the angle data of the plural measuring points P4 P5 and P6 got by this method, the plane surface including the measuring point P4 P5 and P6 is operated, and the center point Q of the surface and the position of the bolt holes is operated. Hereby, the positional relationship between the position measuring device 3 and the right flange 2b is provided precisely.

Figure 2:
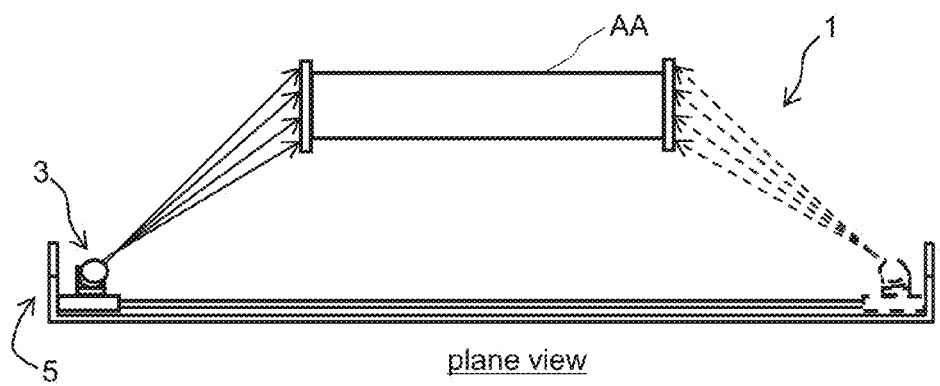
FIG. 2 is a plane view showing some patterns of a pipe to explain a first embodiment of the present invention, and includes (a) (b) (c) and (d), in which (a) is a straight pipe, (b) is a bent pipe having one curve, (c) is a bent pipe having two curves, and (d) is a bent pipe which has a characteristic to an angle of a flange face.
Figure 2:
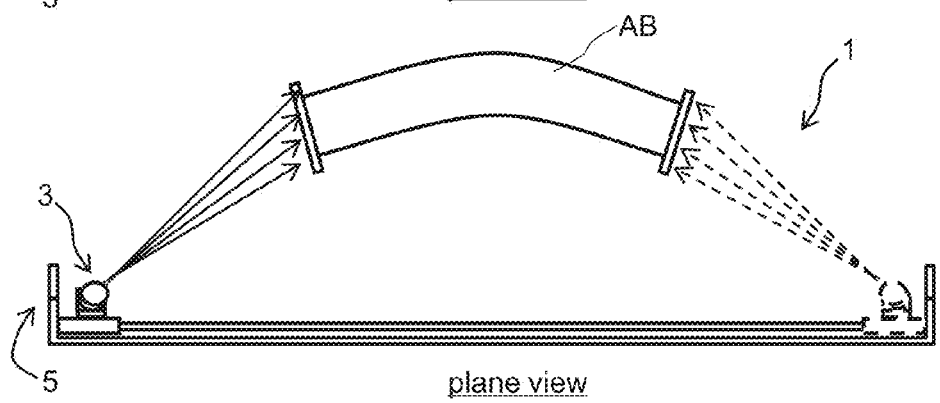
Figure 2:
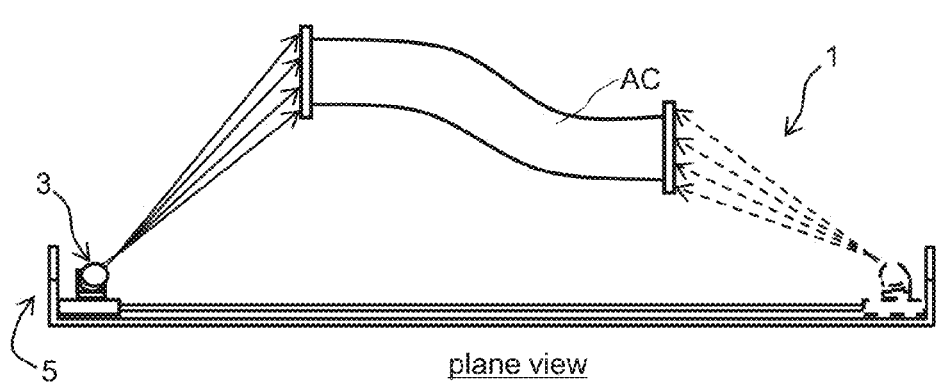
Figure 2:
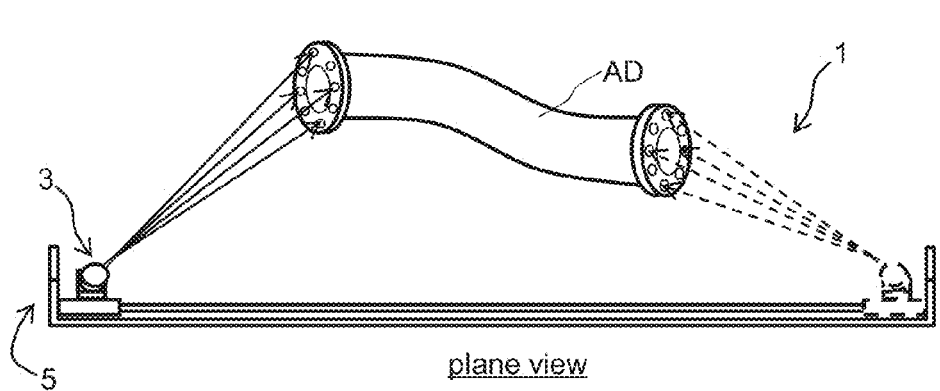

FIG. 2 is a plane view showing some patterns of a pipe to explain a first embodiment of the present invention, and includes (a) (b) (c) and (d), in which (a) is a straight pipe, (b) is a bent pipe having one curve, (c) is a bent pipe having two curves, and (d) is a bent pipe which has a characteristic to an angle of a flange face.

In a similar way with the above embodiment, in case of the pipe AA AB AC AD showing in (a) (b) (c) (d) of FIG. 2 instead of the pipe 2 in the repair-pipe/designed-pipe measuring system 1 showing in (a) (b) (c) of FIG. 1, the electronic data of the spatial position of the flange side in the flange pair of the both ends of each pipe can be easily acquired.

Next, the detail of a repair-pipe/designed-pipe measuring system according to a second embodiment of the present invention will be described below with reference to the drawing.

The point which the second embodiment is different from the first embodiment, is that in the first embodiment, the flange faces 2aa 2ba in the flange pair 2a 2b are measured by making the position measuring device 3 to move between the left end 6a and the right end 6b of the table board 6, but in the second embodiment, the position measuring devices 3 are set in the each position by establishing the reference stage and the related stage in right and left of the table board 24 without using particularly the sliding mechanism, and the flange faces in the flange pair are measured.

Figure 5:
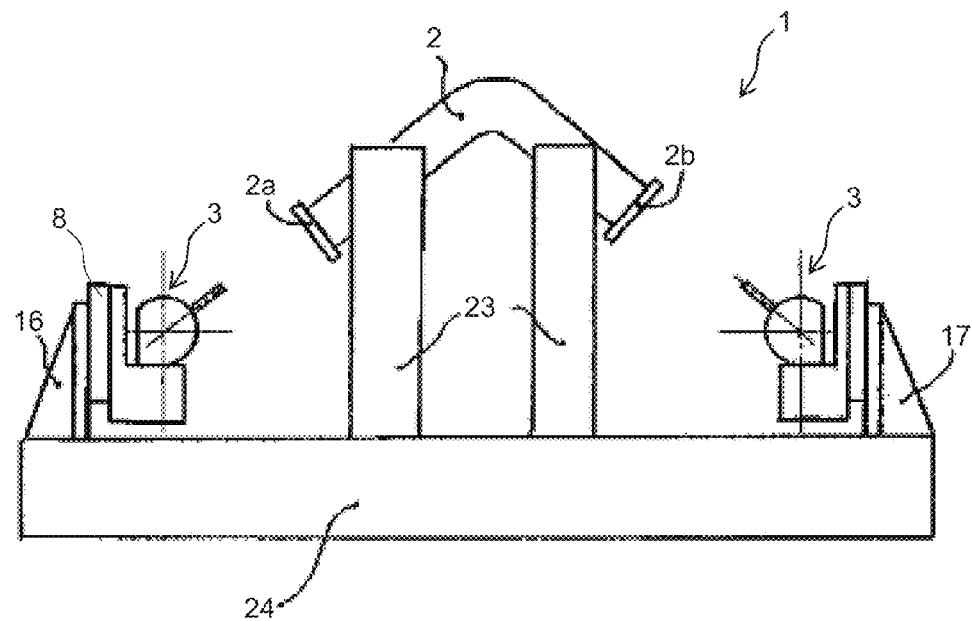
FIG. 5 is a schematic view of a repair-pipe/designed-pipe measuring system to explain a second embodiment of the present invention, and includes (a) (b), in AL which (a) is a elevation view, (b) is a plane view.
Figure 5:
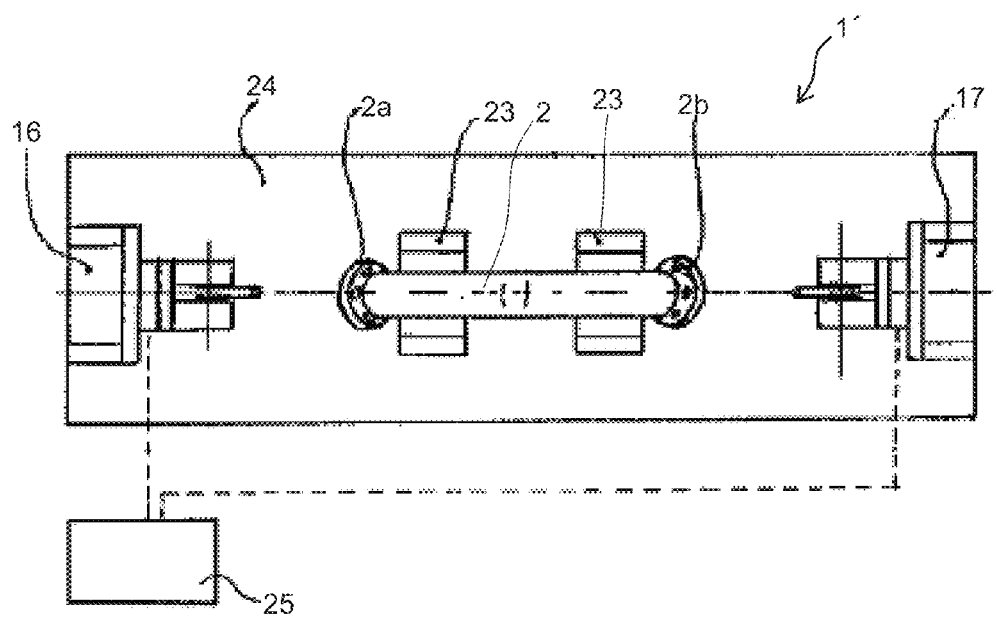

FIG. 5 is a schematic view of a repair-pipe/designed-pipe measuring system to explain a second embodiment of the present invention, and includes (a) (b), in which (a) is a elevation view, (b) is a plane view.

As shown in (a) (b) of FIG. 5, the reference stage 16 which can attach the position measuring device 3, the related stage 17 which can attach the position measuring device 3, which is face-to-face for the reference stage 16, and which has a high accuracy positional relationship with the reference stage 16, and the at least two pipe supporting stages 23, 23 for fixing the object 2, were put on the common table board 24. Furthermore, the repair pipe/designed pipe measuring system 1' comprises the control unit 25 used for operating the positional relationship of the object 2.

As shown in (a) (b) of FIG. 3 and (a) of FICA, the position measuring device 3 comprises the vertical plate 8 which can attach the back side to the reference stage 16 or the related stage 17, the swivel plate 9 which can attach orthogonally on the surface of the vertical plate 8, the swivel 3c having the axis 10 which is parallel to the reference stage 16 or the related stage 17, and which is rotatably attached to the vertical plate 8, the measuring axle 12 which is rotatably attached at right angle to the axis 10, the wire guiding arm 3d which is made of a conductor, is attached to be tilting possibility around an axis at right angle to the axis of the measuring axis 12, the first angle detection sensor 14 and the second angle detection sensor 15 which each measures the swivel angle θ of the swivel 3c and the rotating angle p of the measuring axle 12, the wire length sensor 11 which measures the length of the wire 3a at the measuring point of the wire which was derived from the wire guiding arm 3d in strain state, the arm perception portions 18, 19 consisting of a pair of the discotic boards attached in the swivel 3c in a state to catch both sides of the wire guiding arm 3d, the ditch model contact sensor 20 which turns on at contact with the arm perception portions 18 19, and turns off at non-contact.

Next, the position measuring method which uses the position measuring device 3 will be described below with reference to FIG. 3~FIG. 5.

As shown in FIG. 5, the at least two pipe-supporting stage 23 that can move is put on the center of the table board 24.

The measuring objects 2 is set on the top, and the pipe-supporting stage 23 is fixed by magnets on the table board 24.

Next, as shown in (a) (b) of FIG. 3, the position measuring device 3 is fixed to the mounting surface 29 of the reference stage.

In addition, the hook latching jig 27 is fixed to any three places of the bolt hole of the reference flange 2a of the object 2.

At this time, the hook latching jig 27 is fixed by the nuts 28 with the taper from the back side of the flange 2a so that the center of the hook latching jig 27 becomes the center of the bolt hole. And the wire 3a is drawn from the tip of the wire guiding arm 3d of the position measuring device 3, and the wire tip hook 26 is fixed the hook latching jig 27. The wire guiding arm 3d tilts to the direction of the reference flange 2a because the wire 3a has the tension as the wire encoder.

The output signal of the wire-length I (L) of one measuring point P1, the swivel angle θ between the wire guiding arm 3d and the swivel 3c, and the rotating angle φ of the measuring axis 12 is input into the control unit 25.

By the similar method, the other two measuring points P2, P3 are measured.

Based on the distance data and the angle data of the plural measuring points P1 P2 and P3 got by this method, the plane surface including the measuring point P1 P2 and P3 is operated, and the center point P of the surface and the position of the bolt holes is operated. Hereby, the positional relationship between the reference stage 16 and the reference flange 2a is provided precisely.

Next, as shown in (a) of FIG. 4, the position measuring device 3 is fixed to the related stage mounting face 30.

In addition, the hook latching jig 27 is fixed to any three places of the bolt hole of the related flange 2b of the measuring object 2, At this time, the hook latching jig 27 is fixed by the nuts 28 with the taper from the back side of the related flange 2b so that the center of the hook latching jig 27 becomes the center of the bolt hole. And the wire 3a is drawn from the tip of the wire guiding arm 3d of the position measuring device 3, and the wire tip hook 26 is fixed the hook latching jig 27. The wire guiding arm 3d tilts to the direction of the related flange 2b because the wire 3a has the tension as the wire encoder. The output signal of the wire-length I (L) of one measuring point P4, the swivel angle θ between the wire guiding arm 3d and the swivel 3c, and the rotating angle φ of the measuring axis 12 is input into the control unit 25.

By the similar method, the other two measuring points P5, P6 are measured.

Based on the distance data and the angle data of the plural measuring points P4 P5 and P6 got by this method, the plane surface including the measuring point P4 P5 and P6 is operated, and the center point Q of the surface and the position of the bolt holes is operated, Hereby, the positional relationship between the related stage 17 and the related flange 2b is provided precisely.

As shown in (b) of FIG. 4, the reference stage 16 and the related stage 17 are precisely positioned on the table board 24, and the positional relationship is preliminarily provided.

The center point of the reference stage mounting surface 29 is assumed B, and the center point of the related stage mounting surface 30 is assumed R. In this case, because the three vectors of the vector BP, the vector RQ, and the vector BR are provided in the three-dimensional coordinate, the vector PQ can easily get. The vector PQ shows the distance and the direction for between the center of the reference flange 2a and the center of the related flange 2b. In addition, Since the tilt of the face of the flanges and the position of the bolt hole in the reference flange 2a and the related flange 2b are operated in measured result, the positional relationship of the reference flange 2a and the related flange 2b are decided precisely.

Although the preferable embodiments are described above, the present invention is not limited to be above embodiments but various changes can make without departing from the spirit of the invention. For example, although in the above embodiment it has been explained as that the objects measured was the pipe or the duct having the flanges, but it can measure the welding pipe without having any flanges by using the simple jig. In addition, it has been explained by using the one pipe without any branch pipes, but it can measure the pipe having some branch pipes. Then, in the above embodiments the constitution of the device has been explained as that the measuring device was put on the common table board, but it is not necessarily put on the common table board. It may be put up on the different table board for downsizing the device. In addition, it has been explained as that the reference stage and the related stage was set in the center of the table board, but it is not necessarily set in the center of the table board. It may be set in the measurable area.

Furthermore, it has been explained as that the each two positionmeasuring device 3 was attached to the reference stage and the related stage and the measurement was done, but it is not necessarily set two. It may be used one by replacing.

Next, the ditch model contact sensor was used as the sensor of the swivel angle in the above embodiment, but it is possible to detect the appropriate position of the swivel angle by the beam sensor of the non-contact.

Next, in the above embodiment, it is explained as that and the measuring points are three, but there is the method to measure four points, and there are the merits as below by measuring of the four points.

In the case of measuring at the three points, it is difficult to check when there are any measuring mistake because the plane is formed only one. However in the case of measuring at the four points, it is easy to judge when there are any measuring mistake because the plane is formed only one when there are not any measuring mistake like the case of non-mistake in measuring at the three points, but the plane is formed plural when there are any measuring mistake.

In addition, since the position measuring device (measurement device) increasingly develops, it may use the constitution using those position measuring device.

As the availability in the industry, the present invention is applied to a repair-pipe/designed-pipe measuring system which measures the flange faces of a pair of flanges at both ends of the a pipe used for carrying a liquid or a gas in ships, plants, and other places, and obtains the spatial position data of the flange faces.

What is claimed is:

1. A repair pipe/designed pipe measuring system (1) is what is measuring the flange faces of a pair of flanges at both ends of a repair pipe/designed pipe and obtaining spatial position data of the flange faces in order that the defective portion is reworked when a defect such as leakage occurs in a pipe used for carrying a liquid or a gas in ships, plants, and other places, the said repair pipe/designed pipe measuring system 1 comprises;

the said repair pipe (2) having the left flange (2a) and the right flange (2b) at both ends of the pipe as a measuring object,
   the position measuring device (3) having the wire centering mechanism (3b) and the swivel (3c) which is possible to measure the length and the angle in the plural positions on the flange face (2aa) of the left flange (2a) and on the flange face (2ba) of the right flange (2b) by using the take-up wire (3a),
   the mobile stage (4) having fixedly the said positioning measuring device (3) on the mobile stage (4), and moving parallel for the said repair pipe (2),
   the mobile stage sliding mechanism (5) which holds this mobile stage (4), and easily slides this mobile stage (4),
   the table board (6) which fixs the said mobile stage sliding mechanism (5),
   the pipe supporting stage (7) which positions the said repair pipe (2) on the said table board (6),
   the said mobile stage sliding mechanism (5) comprises;
   the left side plate (5a) and right side plate (5b) which is fixed at both the right and left ends of the said table board (6),
   the sliding portion (5c) which is set up between the said right side plates (5a) and the said left side plate (5b), and makes the said mobile stage (4) to move on the said sliding portion (5c),
   in addition, the said sliding portion (5c) makes the said mobile stage (4) to move at least one area between the said right side plates (5a) and the said left side plate (5b) in the table board (6), and the position measuring device (3) measures the position of the flange face in the said repair pipe (2) at the position that makes a mobile stage (4) to stop, and the position measuring device (3) makes the wire (3a) to strain which is equipped in the said positioning measuring device (3), and lets contact with the said flange face.

2. The vertical plate (8) which can attach the back side to the reference stage (16) or the related stage (17),
   the swivel plate (9) which can attach orthogonally on the surface of the said vertical plate (8),
   the swivel (3c) having the axis (10) which is parallel to the reference stage (16) or the related stage (17), and which is rotatably attached to the said vertical plate (8),
   the measuring axle (12) which is rotatably attached at right angle to the axis (10),
   the wire guiding arm (3d) that is made of a conductor attached to be tilting possibility around an axis at right angle to the axis of the said measuring axis,
   the first angle detection sensor (14), and the second angle detection sensor (15) which each measures the swivel angle of the swivel and the rotating angle of the said measuring axle (12),
   the wire length sensor (11) which measure the length of the wire (3a) at the measuring point of the wire which was derived from the said wire guiding arm in strain state, the arm perception portion (18) (19) consisting of a pair of the discotic boards attached in the said swivel in a state to catch both sides of the said wire guiding arm, the said position measuring device (3) having the ditch model contact sensor (20) which makes slightly more the clearance of the said arm perception portions than the width of the said wire guiding arm, and turns on at contact with the said arm perception portion of the said arm in an arbitrary tilting position, and turns off at non-contact, the said reference stage (16) which can attach the said position measuring device, the said related stage (17) which can attach the said position measuring device, which is face-to-face for the said reference stage, and which has a high accuracy positional relationship with the said reference stage, the common table board (24) which the said reference stage, the said related stage, and the at least two pipe supporting stages (23) (23) for fixing the object (22) to be measured such as the repair pipe or the design pipe produced by design drawing, the control unit (25) which operates the position of the measuring point by inputting the output signals of the said first angle detection sensor, the said second angle detection sensor, and the wire length sensor by using the said position measuring device.

\* \* \* \* \*